(12) United States Patent
Costa et al.

(10) Patent No.: US 7,378,072 B2
(45) Date of Patent: May 27, 2008

(54) METHOD FOR THE PREPARATION OF AEROGELS

(75) Inventors: Lorenzo Costa, Sommo (IT); Fulvio Costa, Sommo (IT)

(73) Assignee: Novara Technology S.R.L., Novara (IT)

( * ) Notice: Subject to any disclaimer, the term of this patent is extended or adjusted under 35 U.S.C. 154(b) by 565 days.

(21) Appl. No.: 10/519,986

(22) PCT Filed: Jun. 24, 2003

(86) PCT No.: PCT/EP03/06606

§ 371 (c)(1),
(2), (4) Date: Jan. 4, 2005

(87) PCT Pub. No.: WO2004/007368

PCT Pub. Date: Jan. 22, 2004

(65) Prior Publication Data

US 2005/0244323 A1    Nov. 3, 2005

(30) Foreign Application Priority Data

Jul. 12, 2002    (IT)    ............... NO2002A0010

(51) Int. Cl.
*C01B 33/12* (2006.01)

(52) U.S. Cl. .............. 423/339; 423/335; 423/324; 423/579; 423/594

(58) Field of Classification Search ........ 423/324–350, 423/579–594
See application file for complete search history.

(56) References Cited

U.S. PATENT DOCUMENTS

| 4,610,863 | A | | 9/1986 | Hunt et al. | |
|---|---|---|---|---|---|
| 4,667,417 | A | * | 5/1987 | Graser et al. | ............. 34/337 |
| 5,207,814 | A | * | 5/1993 | Cogliati et al. | ............. 65/396 |
| 5,270,027 | A | * | 12/1993 | Balducci et al. | ............. 423/338 |
| 5,565,142 | A | * | 10/1996 | Deshpande et al. | ............. 252/62 |
| 5,686,031 | A | | 11/1997 | Coronado et al. | |
| 5,795,557 | A | | 8/1998 | Pajonk et al. | |
| 6,315,971 | B1 | | 11/2001 | Wallace et al. | |

FOREIGN PATENT DOCUMENTS

| DE | 196 16 263 A | 10/1997 |
|---|---|---|
| WO | WO 02 04370 A | 1/2002 |
| WO | WO 02/04370 A1 * | 1/2002 |

OTHER PUBLICATIONS

Dean, J.A. (1999). Lange's Handbook of Chemistry (15th Edition). (pp. 6.142-6.158). McGraw-Hill.☐☐Online version available at: http://www.knovel.com/knovel2/Toc.jsp?BookID=47&VerticalID=0.*

* cited by examiner

*Primary Examiner*—Vickie Kim
*Assistant Examiner*—Anthony J Zimmer
(74) *Attorney, Agent, or Firm*—Venable LLP; Thomas G. Wiseman

(57) ABSTRACT

A method for the preparation of aerogels that involves the exchange of the liquid present in the aquagel with xenon and the subsequent extraction thereof.

10 Claims, 1 Drawing Sheet

METHOD FOR THE PREPARATION OF AEROGELS

Figure 1:
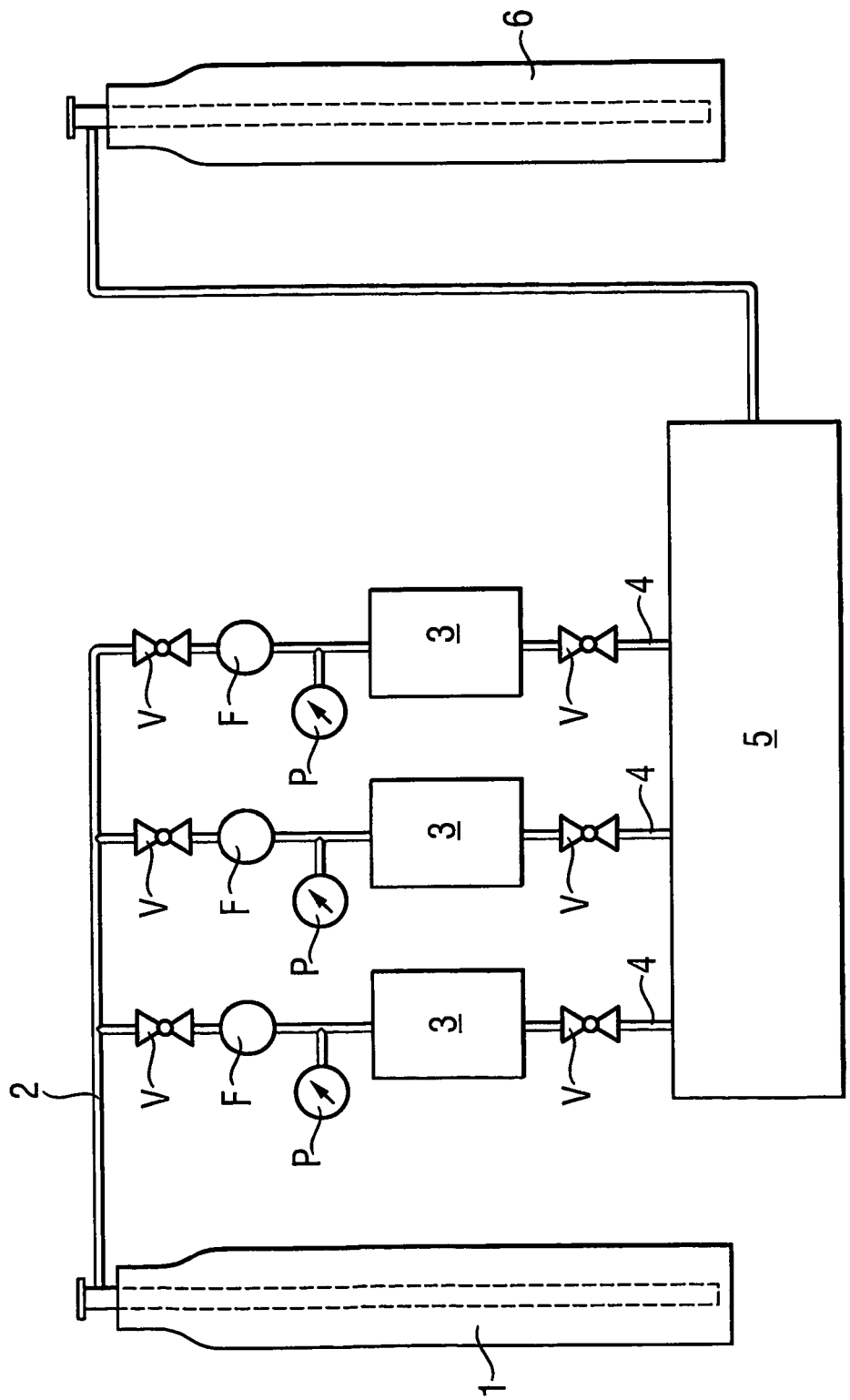

The present invention relates to a process for the preparation of aerogels including an exchange of the liquid present in the wet gel with xenon and a xenon recovery step.

Aerogels are one of the possible products of a sol-gel process. Aerogels, up to now, have found application mainly in the thermoacoustic insulation and in chemical catalysis, as well as intermediate materials in production of glasses and glass ceramics; a new application, currently under study, is an insulation layer of very low dielectric constant in the production of integrated circuits.

It is known that the sol-gel processes are chemical processes according to which a material is produced from a mixture of suitable precursors (called sol), such a material being typically a simple or mixed oxide either as a bulk or as a thin layer onto a carrier.

Sol-gel processes are the subject of important published patent documents and are described, for example, in the following patents: U.S. Pat. Nos. 4,574,063, 4,680,048, 4,810,674, 4,961,767 and 5,207,814.

Water, alcohols and water/alcohol mixtures are usually employed as solvent/diluent for the starting solution, the precursors may be soluble salts of metals and/or of metalloids, for example nitrates, chlorides and acetates or preferably they may be compounds of the general formula $M(OR)_n$, where M is the metal or metalloid atom, O—R is an alcoholic radical (typically the alcoholic radical contains from one to four carbon atoms) and n is the valence of M. Among the most frequently used precursors in sol-gel processes are tetramethoxysilane (known as TMOS) with the formula $Si(OCH_3)_4$ and tetraethoxysilane (known as TEOS) with the formula $Si(OCH_2CH_3)_4$.

The first phase of a sol-gel process is the precursor hydrolysis from water that may be present as solvent or be purposely added in the case of alcoholic solutions, according to the reaction:

$$M(-OR)_n + nH_2O \rightarrow M(OH)_n + nROH \quad (I)$$

This phase is generally helped by low pH values: typically between 0 and 3, preferably between about 1 and 2.

The second phase in the sol-gel process is the condensation of the $M(OH)_n$ species according to the following scheme:

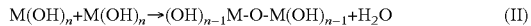

$$M(OH)_n + M(OH)_n \rightarrow (OH)_{n-1}M\text{-}O\text{-}M(OH)_{n-1} + H_2O \quad (II)$$

This reaction, extended to all the $M(OH)_n$ species originally present in solution, leads to an inorganic oxidic polymer with an open structure inglobating within its porosity all the solvent originally present or generated during the hydrolysis. The inorganic, oxidic polymer so produced is called gel.

To find practical application, the gel needs to be dried by careful extraction of all liquid from its pores.

A possible method of drying a gel is by simple solvent evaporation; the dry gel so produced is known as a "Xerogel". As it is known to the experts in the field, the production of xerogels is extremely difficult because of the strong capillary forces produced by the solvent on the pore wall: during evaporation, that normally lead to the destruction of the gel.

An alternative method for producing dry gels is the supercritical (or hypercritical) extraction of the solvent. Dry gels produced by this technique are known as "Aerogels".

During hypercritical drying in suitable autoclaves the liquid present in the gel is subjected to temperature and pressure values that exceed the critical values specific for that liquid. Under those conditions the whole liquid volume passes from the liquid phase to that of supercritical fluid and the related capillary forces inside the pores decrease from the initial value to a reduced value proper for the supercritical fluid. This avoids a destructive phase associated with evaporations occurring during the preparation of xerogels due to the presence of a meniscus inside the pores. The technique of hypercritical extraction of a liquid from a gel is described, for example, in U.S. Pat. Nos. 4,432,956 and 5,395,805. The main problem with this technique is that alcohols, normally present in the gel pores have critical pressure Pc typically above 60-70 bars and critical temperatures Tc above 250° C. Such critical values require the use of autoclaves of high resistance and relatively high cost. Moreover, if the gel product is in the form of film on support (for example in the case of a dielectric insulating film on an integrated circuit), the critical temperatures of alcohols and esters might be too high and may not be compatible with the support or with other materials present on it.

A well known technique to overcome the problem is through the liquid exchange in the wet gel before hypercritical extraction, with a liquid of more favorable critical constants, particularly of a lower Tc. For example, it is possible to use hydrocarbons, as pentane and hexane, that have critical temperature in the range of 200° C. Even in this case, however, the Tc value might be not compatible with all the applications associated with aerogels; moreover, the exchange of a hydroalcoholic liquid with an hydrocarbon, because of the non-mixability of these liquids would require an additional exchange with intermediate liquids, e.g., acetone, with a consequent lengthening of the processing time and the added cost of recycling the organic solvents.

Still another possibility is to exchange the hydroalcoholic liquid with liquid $CO_2$, that has a very favorable Tc value (about 35° C.). This liquid, however, is not miscible with water and requires the use of an intermediate exchange liquid. Acetone, in this case, is not suitable because, if it is mixed with liquid $CO_2$, it prevents $CO_2$ from entering hypercritical transition. It is possible, however, to use, as an intermediate exchange liquid, isoamylacetate; but the double exchange (acetone first, amylacetate second) requires an excessively long process-time for an industrial process and also undesirable solvent-recycling costs.

Applicant has now found that it is possible to prepare the aerogels without the drawbacks associated with the prior art and, according to a preferred embodiment, through a hypercritical extraction step carried out at moderate pressure and temperature values which, further, does not require long times associated with the preceding liquid exchange in the wet gel.

As a matter of fact, an object of the present invention is a method for the preparation of aerogels comprising the exchange of the aquagel liquid phase with xenon, the extraction of xenon and the optional recovery thereof; particular advantages are achieved by carrying out the exchange with liquid xenon and the extraction thereof under supercritical conditions.

The aquagel preparation can be made following one of the preparative processes taught in the art; for example, by hydrolysis of a suitable precursor. In this case, the process will involve a preliminary step of hydrolysis/condensation starting from a suitable precursor.

An embodiment of the present invention is the preparation of the aerogels including:
a) hydrolysis/condensation starting from a precursor;
b) exchange of the liquid in the gel with xenon;

c) supercritical extraction of xenon;
d) optional xenon recovery.

The metallic precursor undergoing the hydrolysis reaction may be any suitable compound known in the art. Therefore, use may be made of soluble salts, such as, nitrates, chlorides and acetate; and preferably alcoxydes or alcoxyde mixtures having the general formula:

$$X\text{-Me-}(OR)_{n-1}$$

wherein Me is a metal of the $3^{rd}$, $4^{th}$ and $5^{th}$ Groups of the Element Periodic System; n is Me valence; X is R or OR, R being acid alkyl radical, linear or branched, having a carbon atom number up to 10.

The hydrolysis is carried out in the presence of a catalyst, preferably an acid, and water may be the solvent, or it may be added to the precursor alcoholic solution; the relevant conditions and procedure are reported in the known art such as, for instance, the one corresponding to U.S. Pat. No. 5,207,814 according to which the hydrolysis is carried out at room temperature and the preferred acid catalysts are chloride acid, nitric acid and acetic acid. Metal oxides, mainly silicon oxide, can be added to the prepared sol to modify the properties thereof, according to, for instance, U.S. Pat. No. 5,207,814.

The liquid present in the wet gel is exchanged with xenon having critical temperature, Tc=16.6° C. and critical pressure, Pc=58.4 bars, over very short times. Once the exchange is completed, xenon is easily extracted without any use of autoclave suitable for high temperature and pressure.

Xenon is a gas at atmospheric pressure and temperature; it belong to the class of the so called rare gases, and traditional is utilized in discharge lamps, in solar lamps, in arch lamps for the production of U.V. radiations, to excite laser cavities, for ionization chambers, in the bubble chambers for the detection of elementary particles.

For the purposes of the current invention, the xenon is maintained liquid with pressure above 58.4 bars and temperature below 16.6° C., preferably below 10° C. To favor interdiffusion processes in the liquid phase within the pore structure, xenon temperature should be not as low, usually not lower than 0° C.

Considering the high cost of xenon, the method of the invention is preferably used with systems that provide the recovery of xenon at the end of the extraction process.

A possible scheme of this type of system is indicated in FIG. 1, to which we here refer merely as an example excluding any restrictive consideration.

System A of FIG. 1 is an example of process of hypercritically drying an aquagel using exclusively xenon. The system includes a reservoir of liquid xenon 1, connected through a line 2 to at least one, but preferably several molds 3, (FIG. 1 shows a system of 3 molds) containing the original aquagels. The molds are connected with discharge lines 4, for the liquid exchanged in the pores (water and/or alcohol) and gaseous xenon at the end of the supercritical extraction process. All lines 4 are converging into one suitable collector 5, with proper temperature under which water and alcohol are solid while xenon is in the liquid phase, for example at a temperature between about −30° C. and −40° C. Finally collector 5 is connected to a reservoir 6 for the recovered xenon, that in certain models could be the same reservoir 1. The system is supplied with open/closed valve, identified as V in FIG. 1, that provide selective insulation of any component of the system. In addition, on the line 2 before each mold 3, there can be connected flow-meters F, to regulate xenon flux in each mold; to each mold is connected a pressure gage P, to control pressure in each mold.

More in general, liquid xenon at temperatures between 0° C. and 16° C. can be flown inside the aquagels to replace the liquid originally contained so that a xenongel is obtained. The xenongel is then subjected to hypercritical or supercritical drying at a temperature above 16.6° C. and pressure above 58.4 bars.

The invention claimed is:
1. A process for the preparation of aerogels comprising,
    a) exchanging the liquid phase of an aquagel with xenon liquid to form a xenongel; and
    b) extracting xenon from the xenongel of step a) under hypercritical or supercritical drying conditions of xenon; and
    c) optionally, recovering xenon from step b).
2. A process for the preparation of aerogels according to claim 1, further comprising, prior to step a), forming an aquagel from a precursor.
3. A process for the preparation of aerogels according to claim 2, wherein the suitable precursor is an alkoxide having the formula:

$$X\text{-Me}(OR)_{n-1}$$

in which Me is a metal belonging to the $3^{rd}$, $4^{th}$ and $5^{th}$ Groups of the Element Periodic Table; n is integer and represents the valence of Me; X is either —OR or —R where-OR is an alkoxide group and —R is an organic radical, linear or branched, having up to 10 carbon atoms.
4. A process for the preparation of aerogels according to claim 3 wherein the precursor is tetramethoxysilane or tetraethoxysilane.
5. A process for the preparation of aerogels according to claim 3 wherein hydrolysis is in presence of an acid selected from hydrochloric, nitric or acetic acid.
6. A process for the preparation of aerogels comprising
    a) forming an aquagel from a precursor;
    b) exchanging the liquid phase of an aquagel with liquid xenon to form a xenongel;
    c) extracting xenon from the xenongel of step b) under supercritical conditions of xenon; and
    d) optionally, recovering xenon from step c).
7. A process for the preparation of aerogels according to claim 6 wherein the exchange is carried with liquefied xenon at temperature between 0 and 16.6° C.
8. A process for the preparation of aerogels according to claim 6 wherein the super critical conditions include a temperature higher than 16.6° C.
9. A process for the preparation of aerogels according to claim 6 wherein the super critical conditions include a pressure higher than 58.4 bar.
10. A process for the preparation of aerogels according to claim 1 further comprising recovering xenon at the end of the extraction.

* * * * *